United States Patent
Yu et al.

(10) Patent No.: US 11,988,257 B2
(45) Date of Patent: May 21, 2024

(54) DISK BRAKE

(71) Applicant: HITACHI AUTOMOTIVE SYSTEMS, LTD., Ibaraki (JP)

(72) Inventors: Hao Yu, Atsugi (JP); Atsushi Odaira, Yokohama (JP); Koichi Sakimoto, Fuchu (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 516 days.

(21) Appl. No.: 17/253,334

(22) PCT Filed: Jun. 13, 2019

(86) PCT No.: PCT/JP2019/023446
§ 371 (c)(1),
(2) Date: Dec. 17, 2020

(87) PCT Pub. No.: WO2020/004057
PCT Pub. Date: Jan. 2, 2020

(65) Prior Publication Data
US 2021/0262539 A1 Aug. 26, 2021

(30) Foreign Application Priority Data

Jun. 26, 2018 (JP) .................................. 121045/2018
Jan. 29, 2019 (JP) .................................. 013080/2019

(51) Int. Cl.
*B60T 13/74* (2006.01)
*F16D 55/227* (2006.01)
*F16D 65/18* (2006.01)

(52) U.S. Cl.
CPC ............ *F16D 55/227* (2013.01); *B60T 13/74* (2013.01); *F16D 65/18* (2013.01)

(58) Field of Classification Search
CPC ...... B60T 13/741; F16D 55/227; F16D 65/18; F16D 2121/24; F16D 2125/48; F16D 55/2265; F16D 55/22655
See application file for complete search history.

(56) References Cited

U.S. PATENT DOCUMENTS

RE30,255 E * 4/1980 Rath ................. F16D 55/22655
188/73.45
4,342,382 A * 8/1982 Rath ................. F16D 55/22655
188/73.47
(Continued)

FOREIGN PATENT DOCUMENTS

CN 1263838 8/2000
DE 10054474 C1 * 2/2002 ........... F16D 55/227
(Continued)

OTHER PUBLICATIONS

Machine translation of DE 10054474 (no date).*
(Continued)

*Primary Examiner* — Nicholas J Lane
(74) *Attorney, Agent, or Firm* — Wenderoth, Lind & Ponack, L.L.P.

(57) ABSTRACT

The present disk brake includes a carrier fixed to a non-rotatable portion of a vehicle, a caliper attached to this carrier and including a piston configured to press an inner brake pad, a slide pin fixed to any of the carrier and the caliper and configured to allow the caliper to slidably move relative to the carrier in an axial direction of a wheel, and a driving mechanism including an electric motor and a speed reduction mechanism and configured to transmit a driving force of the electric motor to the piston via the speed reduction mechanism. At least a part of the driving mechanism is disposed on an extension of an axis of the slide pin. This configuration can prevent an increase in the size of the present disk brake, thereby improving the mountability thereof onto a vehicle.

5 Claims, 10 Drawing Sheets

(56) References Cited

U.S. PATENT DOCUMENTS

| | | | |
|---|---|---|---|
| 4,784,243 | A | 11/1988 | Méry |
| 6,325,182 | B1 | 12/2001 | Yamaguchi et al. |
| 6,454,056 | B1 | 9/2002 | Iida |
| 2007/0068748 | A1* | 3/2007 | Chittka .................. F16D 65/18 188/72.7 |
| 2012/0292141 | A1* | 11/2012 | Takahashi ............... F16D 65/18 188/72.3 |
| 2016/0069403 | A1 | 3/2016 | Yamasaki et al. |
| 2018/0045258 | A1 | 2/2018 | Kimura et al. |
| 2018/0079400 | A1* | 3/2018 | Crossman ............. B60T 15/028 |

FOREIGN PATENT DOCUMENTS

| | | |
|---|---|---|
| DE | 10 2008 023 101 | 11/2009 |
| JP | 59-137631 | 8/1984 |
| JP | 2002-89598 | 3/2002 |
| JP | 2008-207679 | 9/2008 |
| JP | 2011-158058 | 8/2011 |
| JP | 2016-056848 | 4/2016 |

OTHER PUBLICATIONS

Communication pursuant to Article 94(3) EPC dated Apr. 5, 2022 in corresponding European Patent Application No. 19825161.3.
Extended European Search Report dated Jun. 9, 2021 in European Patent Application No. 19825161.3
International Search Report dated Jul. 23, 2019 in International Application No. PCT/JP2019/023446 with English translation.
Written Opinion of the International Searching Authority dated Jul. 23, 2019 in International Application No. PCT/JP2019/023446 with English translation.
Office Action dated Apr. 13, 2022 in Japanese Patent Application No. 2020-527390, with English-language translation.
Office Action dated Nov. 19, 2021 in corresponding Chinese Application No. 201980040439.8, with English translation, 9 pages.

* cited by examiner

DISK BRAKE

TECHNICAL FIELD

The present invention relates to a disk brake including an electric motor that is used to brake a vehicle.

BACKGROUND ART

As a disk brake, PTL 1 discloses a disk brake including a caliper, a driving mechanism, a transmission mechanism, and a housing. The caliper includes a piston that presses brake pads against a disk rotor. The brake pads are disposed on both sides of the disk rotor while sandwiching the disk rotor therebetween. The driving mechanism is provided in this caliper and drives the piston. The transmission mechanism transmits a driving force of an electric motor to this driving mechanism. The housing houses this transmission mechanism, and is attached to the caliper.

CITATION LIST

Patent Literature

PTL 1: Japanese Patent Application Public Disclosure No. 2016-56848

SUMMARY OF INVENTION

Technical Problem

The above-described disk brake disclosed in PTL 1, if attempting to acquire a great braking force and excellent responsiveness, necessitates an increase in the output of the electric motor, an increase in the speed reduction ratio of the transmission mechanism, and the like as indispensable conditions therefor, thus necessitating increases in the sizes of the electric motor and the transmission mechanism. Further, when the slide pin is disposed on the outer side in the radial direction or the tangential direction of the disk rotor to avoid the electric motor and the transmission mechanism, this undesirably leads to increases in the sizes of the caliper and the carrier to thus impair the mountability onto the vehicle and also raise a possibility of a weight increase, thereby being required to be improved.

Solution to Problem

Under these circumstances, an object of the present invention is to provide a disk brake that prevents the size increases, thereby improving the mountability onto the vehicle.

According to one aspect of the present invention, a disk brake includes a carrier fixed to a non-rotatable portion of a vehicle, a caliper attached to this carrier and including a piston configured to press a braking member, a slide pin fixed to any of the carrier and the caliper and configured to support the caliper slidably relative to the carrier in an axial direction of a wheel, and a driving mechanism including an electric motor and a speed reduction mechanism and configured to transmit a driving force of the electric motor to the piston via the speed reduction mechanism. At least a part of the driving mechanism is disposed on an extension of an axis of the slide pin.

Advantageous Effects of Invention

The disk brake according to the one aspect of the present invention can prevent the size increases, thereby improving the mountability onto the vehicle.

DESCRIPTION OF EMBODIMENTS

In the following description, embodiments of the present invention will be described in detail with reference to FIGS. 1 to 14.

Figure 1:
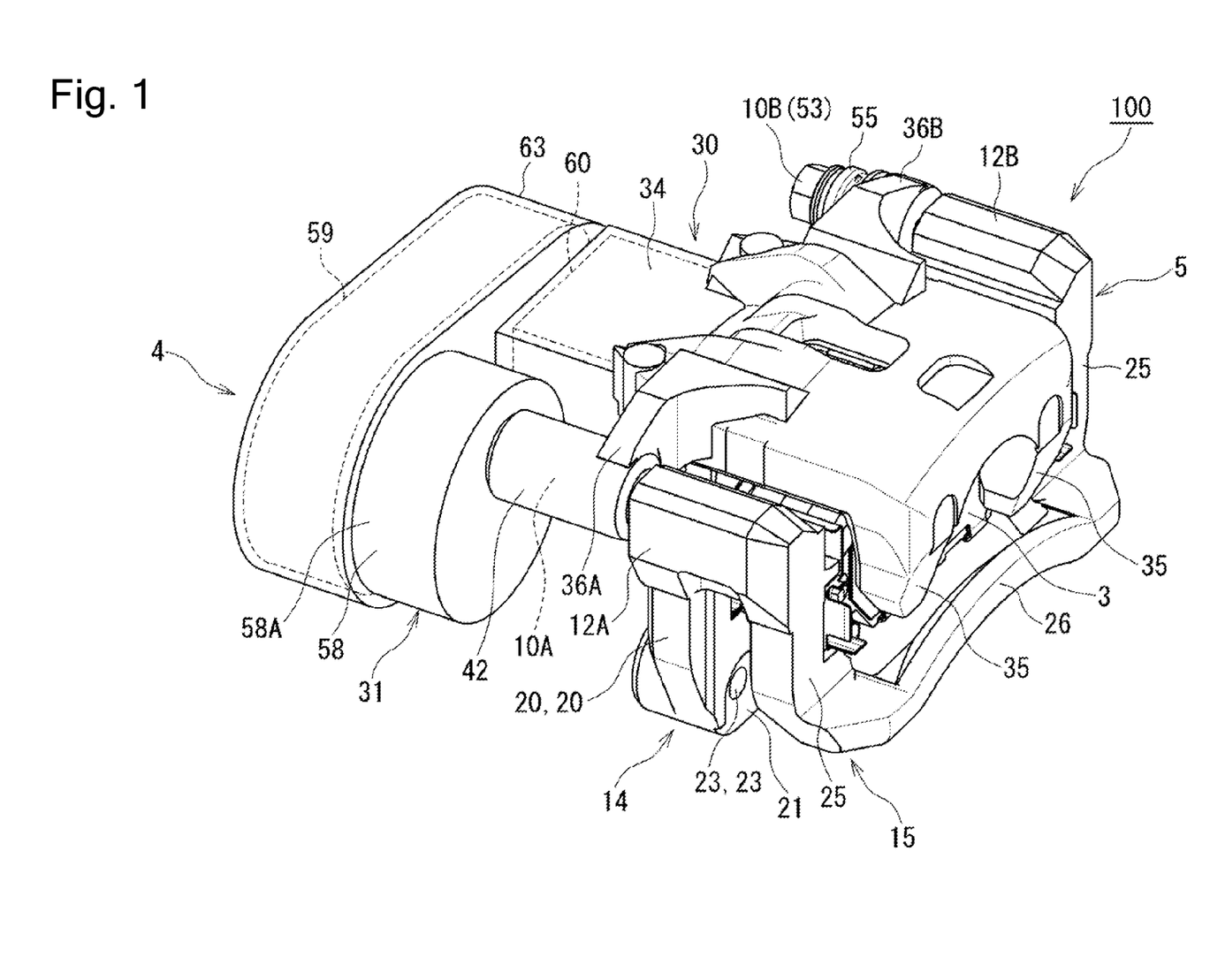
FIG. 1 is a perspective view of a disk brake according to a first embodiment.
Figure 2:
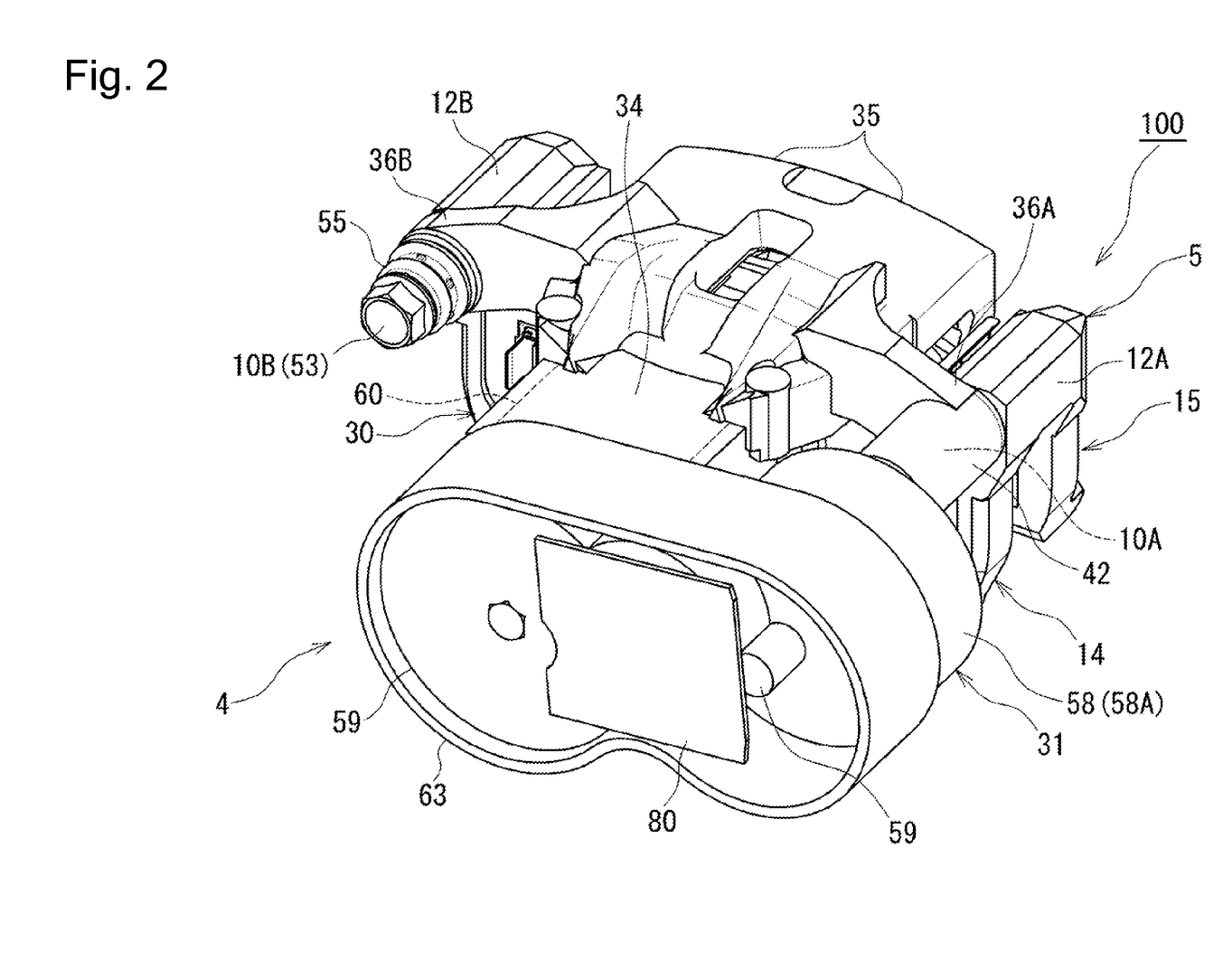
FIG. 2 is a perspective view of the disk brake according to the first embodiment.
Figure 3:
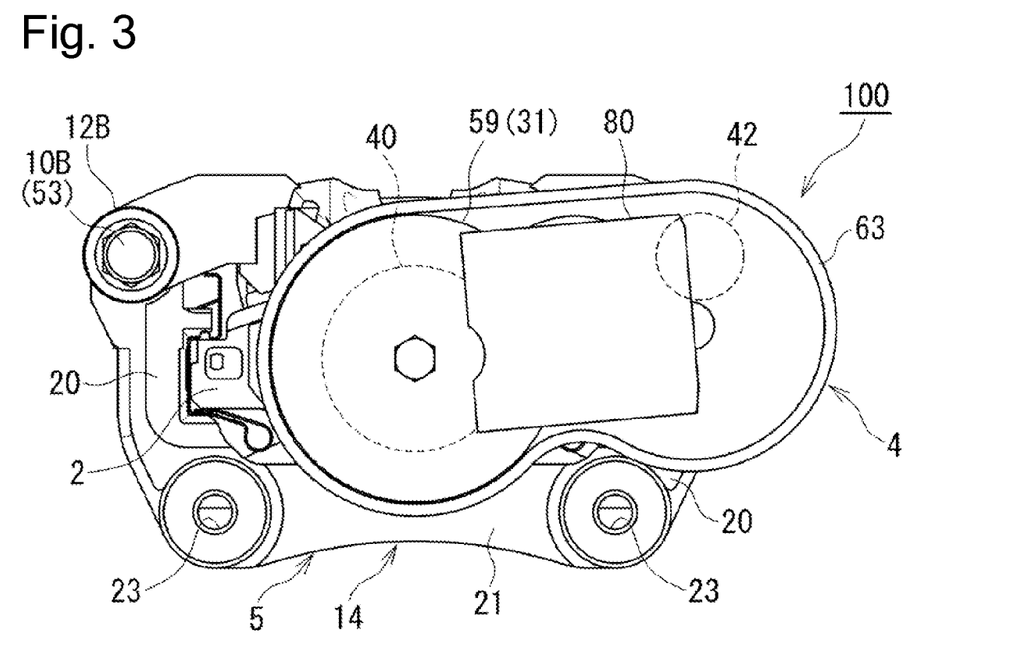
FIG. 3 is a front view of the disk brake according to the first embodiment as viewed from an inner side.
Figure 4:
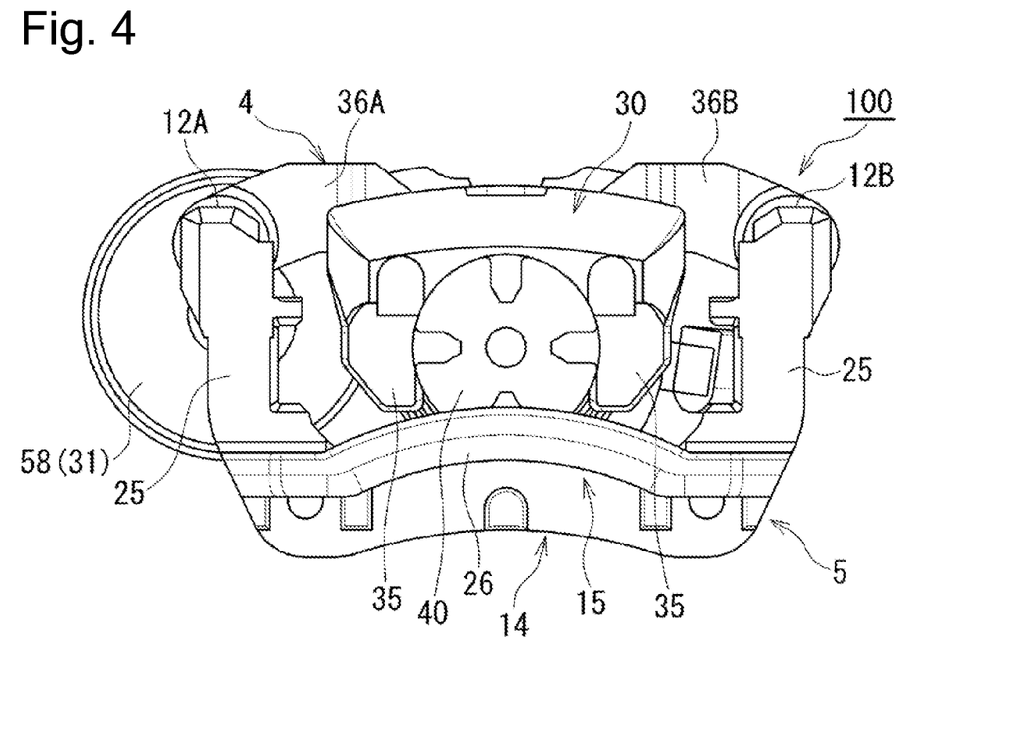
FIG. 4 is a rear view of the disk brake according to the first embodiment as viewed from an outer side with inner and outer brake pads omitted from the illustration.

Disk brakes 100, 200, and 300 according to first to third embodiments are each an electric brake apparatus that generates a braking force by driving an electric motor 58 when a vehicle runs normally. Hereinafter, the term "inner side" will be used to refer to the inner side of the vehicle, and the term "outer side" will be used to refer to the outer side of the vehicle. First, the disk brake 100 according to the first embodiment will be described with reference to FIGS. 1 to 7. As illustrated in FIGS. 1 to 3, the disk brake 100 according to the first embodiment is equipped with a pair of inner and outer brake pads 2 (refer to FIG. 3) and 3 (refer to FIG. 1), and a caliper 4. The pair of inner and outer brake pads 2 and 3 is a braking member disposed on both axial sides of a disk rotor D mounted at a rotatable portion of the vehicle. The present disk brake 100 is configured as a floating caliper-type disk brake. The pair of inner and out brake pads 2 and 3, and the caliper 4 are supported on a carrier 5, which is fixed to a non-rotatable portion such as a knuckle of the vehicle, movably relative to this carrier 5 in the axial direction of the disk rotor D (the wheel).

Figure 5:
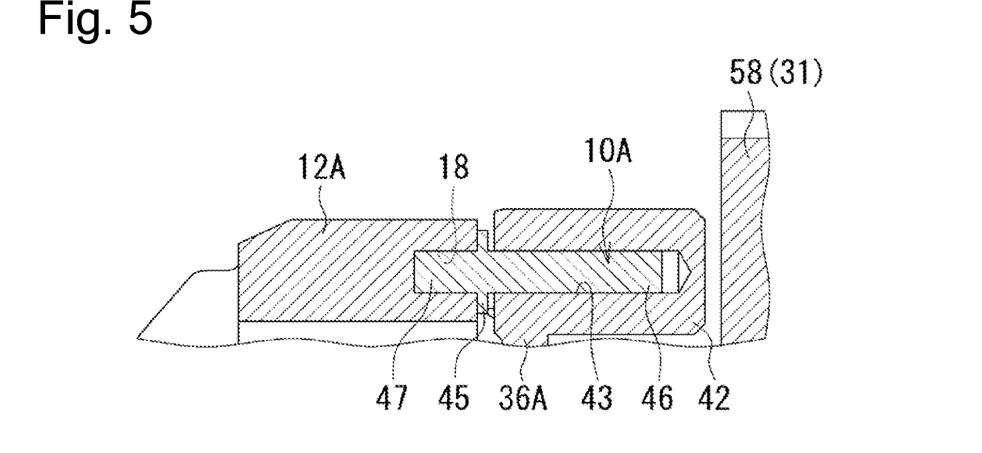
FIG. 5 is a cross-sectional view illustrating a support structure using one of slide pins that is employed in the disk brake illustrated in FIG. 1.
Figure 6:
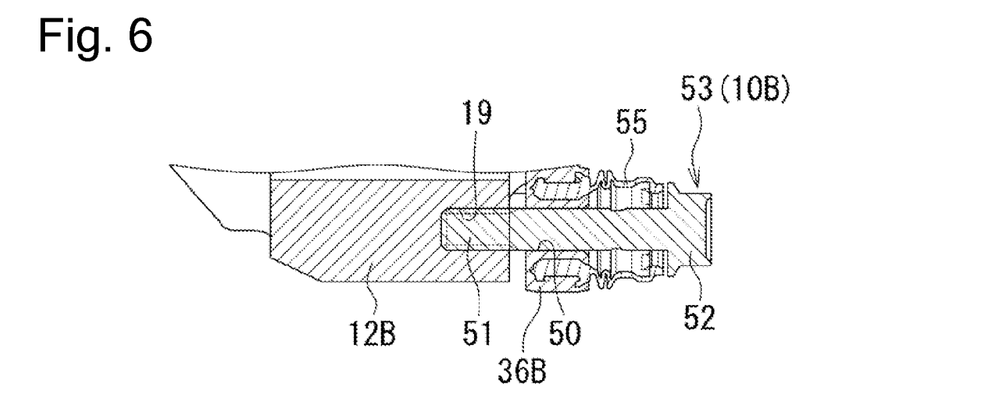
FIG. 6 is a cross-sectional view illustrating a support structure using the other of the slide pins that is employed in the disk brake illustrated in FIG. 1.

As illustrated in FIGS. 1 to 3, the carrier 5 includes a pair of pin support portions 12A and 12B and inner-side and outer-side support portions 14 and 15. Slide pins 10A and 10B are supported on the pair of pin support portions 12A and 12B, respectively. The inner-side and outer-side support portions 14 and 15 are integrally connected to the pair of pin support portions 12A and 12B, and support the inner and outer brake pads 2 and 3 individually independently. The pair of pin support portions 12A and 12B are arranged at some interval therebetween in the rotational direction of the disk rotor D, and both the pin support portions 12A and 12B each extend along the axial direction of the disk rotor D (the vehicle). Each of the pin support portions 12A and 12B is formed into a generally columnar shape. As illustrated in FIG. 5, a press-fitting recessed portion 18 is formed on the end surface on the inner side of the pin support portion 12A, which is one of the pin support portions 12A and 12B. As illustrated in FIG. 6, a female screw hole 19 is formed on the end surface on the inner side of the pin support portion 12B, which is the other of the pin support portions 12A and 12B. As illustrated in FIGS. 1 to 3, the inner-side support portion 14 is integrally connected to the inner side of each of the pin support portions 12A and 12B. The outer-side support portion 15 is integrally connected to the outer side of each of the pin support portions 12A and 12B at some interval from the inner-side support portion 14 in the axial direction of the disk rotor D.

The inner-side support portion 14 includes a pair of inner-side arm portions 20 and 20 and an inner-side beam portion 21. The pair of inner-side arm portions 20 and 20 extends from the pin support portions 12A and 12B approximately perpendicularly thereto, respectively. The inner-side beam portion 21 connects the end portions of this pair of inner-side arm portions 20 and 20 to each other. The inner brake pad 2 is supported movably along the axial direction of the disk rotor D inside the pair of inner-side arm portions 20 and 20. Through-holes 23 and 23 are formed at both the ends of the inner-side beam portion 21 in the rotational direction of the disk rotor D, respectively. The through-holes 23 and 23 extend therethrough along the axial direction of the disk rotor D. The carrier 5 is attached to the non-rotatable portion of the vehicle via each of the through-holes 23 and 23 provided at the inner-side support portion 14 (the inner-side beam portion 21). The outer-side support portion 15 includes a pair of outer-side arm portions 25 and 25 and an outer-side beam portion 26. The pair of outer-side arm portions 25 and 25 extends from the pin support portions 12A and 12B approximately perpendicularly thereto, respectively. The outer-side beam portion 26 connects the end portions of this pair of outer-side arm portions 25 and 25 to each other. The outer brake pad 3 is supported movably along the axial direction of the disk rotor D inside the pair of outer-side arm portions 25 and 25.

As illustrated in FIGS. 1 to 3, the caliper 4 includes a caliper main body 30 and a driving mechanism 31. The caliper main body 30 is the main body of the caliper 4. The driving mechanism 30 includes an electric motor 58 and a speed reduction mechanism (or speed reducer) 59, and transmits a driving force from the electric motor 58 to a piston 40 (also refer to FIG. 4) in a cylinder portion 34 (a cylinder bore) of the caliper main body 30 via the speed reduction mechanism 59. The cylindrical cylinder portion 34, a pair of claw portions 35 and 35, and a pair of caliper arm portions 36A and 36B are integrally formed on the caliper main body 30. The cylinder portion 34 is disposed on the proximal end side facing the inner brake pad 2 on the inner side of the vehicle, and is opened toward this inner brake pad 2. The pair of claw portions 35 and 35 extend from the cylinder portion 34 to the outer side across over the disk rotor D, and is disposed on the distal end side facing the outer brake pad 3 on the outer side. The pair of caliper arm portions 36A and 36B extend from the cylinder portion 34 radially outward.

The piston 40 (refer to FIGS. 3 and 4) is supported in the cylinder bore of the cylinder portion 34 relatively non-rotatably and movably along the axial direction. When the braking is applied, the driving force from the electric motor 58, which is a component of the driving mechanism 31 that will be described below, is transmitted to the piston 40 via the speed reduction mechanism 59 and a thrust force application mechanism 60, which are components of the driving mechanism 31, and this piston 40 presses the inner brake pad 2 while advancing toward the disk rotor D. On the other hand, when the braking is released, the driving force from the electric motor 58, which is the component of the driving mechanism 31, is transmitted to the piston 40 via the speed reduction mechanism 59 and the thrust force application mechanism 60, which are the components of the driving mechanism 31, thereby allowing the piston 40 to be retracted from the inner brake pad 2.

As illustrated in FIGS. 1 to 3, the pair of caliper arm portions 36A and 36B protrude out of the cylinder portion 34 by approximately equal amounts. Also referring to FIG. 5, a bottomed cylindrical boss portion 42 is integrally provided in a protruding manner toward the inner side on the caliper arm portion 36A, which is one of the pair of caliper arm portions 36A and 36B. This boss portion 42 extends along the axial direction of the disk rotor D. A sliding movement hole 43 is formed in the boss portion 42 so as to have a predetermined depth. The sliding movement hole 43 is opened on the end surface of the boss portion 42 on the outer side. A sliding movement shaft portion 46 and a fixed attachment shaft portion 47 are integrally formed on the slide pin 10A, which is one of the slide pins 10A and 10B. The sliding movement shaft portion 46 extends from a flange portion 45 toward the inner side. The fixed attachment shaft portion 47 extends from the flange portion 45 toward the outer side. Then, the fixed attachment shaft portion 47 of the one slide pin 10A is press-fitted in the press-fitting recessed portion 18 provided on the end surface of the one pin support portion 12A on the inner side, and the sliding movement shaft portion 46 of the one slide pin 10A is inserted through the sliding movement hole 43 provided in the one caliper arm portion 36A (the boss portion 42) slidably along the axial direction. As a result, the caliper main body 30 can be supported with use of the one slide pin 10A slidably relative to the carrier 5 along the axial direction of the disk rotor D (the wheel). The fixed attachment shaft portion 47 of the one slide pin 10A and the one pin support portion 12A may be coupled by being threadably engaged with each other.

Referring to FIG. 6, a through-hole 50 is formed at the distal end of the caliper arm portion 36B, which is the other of the pair of caliper arm portions 36A and 36B. The through-hole 50 extends therethrough in the axial direction of the disk rotor D. The other slide pin 10B is formed by a hexagonal bolt 53 including a hexagonal head portion 52. Then, a male screw portion 51 of the hexagonal bolt 53, which is the slide pin 10B, is threadably engaged with a female screw hole 19 provided on the end surface of the other pin support portion 12B on the inner side while being inserted through the through-hole 50 of the other caliper arm portion 36B. As a result, the caliper main body 30 can be supported with use of the other slide pin 10B slidably relative to the carrier 5 along the axial direction of the disk rotor D (the wheel). Further, a space is formed in the axial direction between the end surface of the other caliper arm portion 36B on the inner side and the hexagonal head portion 52 of the other slide pin 10B (the hexagonal bolt 53). A pin boot 55 is provided between around the through-hole 50 of the other caliper arm portion 36B and the hexagonal head portion 52 of the other slide pin 10B (the hexagonal bolt 53). The pin boot 55 includes an extensible and compressible bellows portion so as to cover the other slide pin 10B. As seen from FIG. 1, the hexagonal bolt 53 as the slide pin 10B is placed in such a manner that the hexagonal head portion 52 thereof is located on the inner side corresponding to the electric motor 58 and speed reduction mechanism 59 side in the axial direction of the disk rotor D.

As illustrated in FIGS. 1 to 3, the driving mechanism 31 includes the electric motor 58 that is a motor, the speed reduction mechanism 59, and the thrust force application mechanism 60. The speed reduction mechanism 59 powers up a rotational torque from the electric motor 58. The thrust force application mechanism 60 converts the rotational motion from this speed reduction mechanism 59 into a linear motion to apply a thrust force to the piston 40. The electric motor 58 is arranged in such a manner that the axis thereof extends generally in parallel with the axis of the cylinder portion 34 of the caliper main body 30. The electric motor 58 is configured in such a manner that the outer diameter of a main body portion 58A thereof is greater than the axial length thereof. A rotational shaft (not illustrated) of the electric motor 58 extends along the axial direction of the disk rotor D, and extends into a gear housing 63, which will be described below.

A part of the driving mechanism 31, i.e., the electric motor 58 is disposed on an extension of the axis of the one slide pin 10A. The electric motor 58 is disposed on an extension of the axis of the boss portion 42 provided on the one caliper arm portion 36A. In other words, the electric motor 58 axially overlaps the boss portion 42 provided on the one caliper arm portion 36A, i.e., the one slide pin 10A. The electric motor 58 is disposed in such a manner that the bottom surface of the boss portion 42 is located near the bottom surface of the electric motor 58 while the bottom surface of the main body portion 58A of the electric motor 58 and the bottom surface of the boss portion 42 (the surface on the inner side) provided on the one caliper arm portion 36A face each other. The radial entire region of the boss portion 42 provided on the one caliper arm portion 36A, naturally meaning the entire radial region of the one slide pin 10A is located within the radial range of the bottom surface of the electric motor 58.

The speed reduction mechanism 59 functions to power up the rotational torque from the electric motor 58 to transmit it to the thrust force application mechanism 60. For example, a planetary gear speed reduction mechanism is employed as the speed reduction mechanism 59. This speed reduction mechanism 59 is housed in the gear housing 63. The rotation from the rotational shaft of the electric motor 58 is transmitted to the speed reduction mechanism 59. The gear housing 63 is disposed so as to extend across over the cylinder portion 34 of the caliper main body 30 and the electric motor 58. The gear housing 63 is formed so as to have a size enough to cover the entire regions of the cylinder portion 34 and the electric motor 58 from the inner side. The gear housing 63 may be formed so as to have a size enough to cover a part of the cylinder portion 34 and the entire region of the electric motor 58 from the inner side, may be formed so as to have a size enough to cover the entire region of the cylinder portion 34 and a part of the electric motor 58, or may be formed so as to have a size enough to cover a part of the cylinder portion 34 and a part of the electric motor 58. In sum, the size of the gear housing 63 is not especially limited.

The one pin support portion 12A including the one slide pin 10A is disposed so as to be covered by the gear housing 63 from the inner side, and the other pin support portion 12B including the other slide pin 10B is located outside the gear housing 63. Both the pair of pin support portions 12A and 12B including the pair of slide pins 10A and 10B may be disposed so as to be covered by the gear housing 63 from the inner side. The thrust force application mechanism 60 is disposed between the bottom portion of the cylinder portion 34 and the piston 40 in the cylinder bore of the cylinder portion 34 of the caliper main body 30. The thrust force application mechanism 60 functions to convert the rotational motion from the speed reduction mechanism 59 into the linear motion to apply the thrust force to the piston 40, and, normally, a rotation-linear motion conversion mechanism, such as a ball screw mechanism and a ball and ramp mechanism, is employed as it.

For the support structures using the pair of slide pins 10A and 10B, i.e., the support structures supporting the caliper main body 30 slidably along the axial direction with use of the pair of slide pins 10A and 10B, the support structure using the one slide pin 10A illustrated in FIG. 5 may be employed for both the support structures using the pair of slide pins 10A and 10B, or the support structure using the other slide pin 10B illustrated in FIG. 6 may be employed for both the support structures using the pair of slide pins 10A and 10B. Alternatively, a support structure using a slide pin 10C according to another embodiment illustrated in FIG. 7 may be employed for both or any one of the support structures using the pair of slide pins 10A and 10B.

Figure 7:
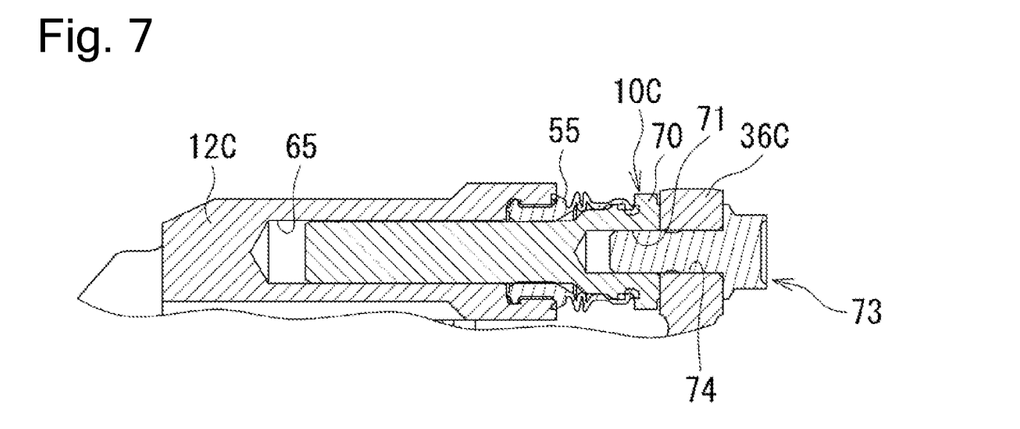
FIG. 7 is a cross-sectional view illustrating a support structure using a slide pin according to another embodiment.

More specifically, in the support structure using the slide pin 10C according to the other embodiment, a sliding movement hole 65 is formed in a pin support portion 12C of the carrier 5 so as to have a predetermined depth from the end surface thereof on the inner side as illustrated in FIG. 7. The slide pin 10C includes a hexagonal head portion 70 on the end portion thereof on the inner side, and is configured in such a manner that a female screw hole 71 is formed so as to have a predetermined depth from the radial center of the end surface on the inner side. Then, the slide pin 10C is inserted through the sliding movement hole 65 of the pin support portion 12C, and the inner-side end surface of the hexagonal head portion 70 of this slide pin 10C is brought into abutment with a corresponding caliper arm portion 36C of the caliper main body 30. Then, a hexagonal bolt 73 is inserted through a through-hole 74 of the caliper arm portion 36C, and is threadably engaged with the female screw hole 71 of the slide pin 10C. As a result, the slide pin 10C is fixedly attached to the caliper arm portion 36C of the caliper main body 30 by the hexagonal bolt 73, and this slide pin 10C is inserted through the sliding movement hole 65 of the pin support portion 12C axially slidably. As a result, the caliper main body 30 can be supported with use of the slide pin 10C slidably relative to the carrier 5 along the axial direction of the disk rotor D (the wheel). The pin boot 55 is provided between around the sliding movement hole 65 of the pin support portion 12C and the hexagonal head portion 70 of the slide pin 10C. The pin boot 55 includes the extensible and compressible bellows portion so as to cover the slide pin 10C.

Then, in the disk brake 100 according to the first embodiment, when the vehicle is braked while running normally, the electric motor 58 of the driving mechanism 31 is driven by an instruction from a control board 80 (refer to FIG. 2), and a rotation in a positive direction, i.e., in a brake applying direction is transmitted to the speed reduction mechanism 59 of the driving mechanism 31. Subsequently, the rotation powered up by the speed reduction mechanism 59 is transmitted to the thrust force application mechanism 60 of the driving mechanism 31, and the rotational motion from the speed reduction mechanism 59 is converted into the linear motion by this thrust force application mechanism 60, by which the piston 40 advances to press the inner pad 2 against the disk rotor D due to the advancement of this piston 40. Then, due to a reaction force to the pressing force applied from the piston 40 to the inner brake pad 2, the caliper main body 30 is moved to the inner side relative to the carrier 5 with the aid of the axial sliding movements of the pair of slide pins 10A and 10B relative to the insides of the sliding movement hole 43 and the through-hole 50 of the pair of caliper arm portions 36A and 36B, and presses the outer brake pad 3 in contact with the pair of claw portions 35 and 35 against the disk rotor D. As a result, the disk rotor D is sandwiched between the pair of inner and outer brake pads 2 and 3, and a frictional force is generated and thus the braking force is generated on the vehicle.

The above-described disk brake 100 according to the first embodiment is configured in such a manner that at least a part of the driving mechanism 31, i.e., the electric motor 58 is disposed on the extension of the axis of the one slide pin 10A, thereby being able to prevent increases in the protruding amounts of the pair of caliper arm portions 36A and 36B from the cylinder portion 34 even with increases in the sizes of the electric motor 58 and the speed reduction mechanism 59 of the driving mechanism 31, and thus being able to prevent an increase in the size of the present disk brake 100 to improve the mountability thereof onto the vehicle and also prevent a weight increase as a result thereof. Further, any one or both of the pair of pin support portions 12A and 12B including the pair of slide pins 10A and 10B can be disposed so as to be covered by the driving mechanism 31 (the gear housing 63) from the inner side. Then, the increase in the size of the disk brake 100 can be further prevented by employing the configuration in which both of the pair of pin support portions 12A and 12B including the pair of slide pins 10A and 10B are disposed so as to be covered by the driving mechanism 31 (the gear housing 63) from the inner side.

Further, in the disk brake 100 according to the first embodiment, the one slide pin 10A is fixedly press-fitted in the one pin support portion 12A of the carrier 5, and is also axially slidably inserted through the sliding movement hole 43 of the boss portion 42 provided on the one caliper arm portion 36A and axially slidably supports the caliper main body 30. As a result, the disk brake 100 according to the first embodiment does not employ a fastening member such as a hexagonal bolt as the support structure using the one slide pin 10A, thereby preventing interference with the work of attaching the slide pin 10A even with a part of the driving mechanism 31 disposed on the extension of the axis of the slide pin 10A.

Further, in the disk brake 100 according to the first embodiment, the electric motor 58, which is the electric motor recited in the claims, is disposed on the extension of the axis of the one slide pin 10A as the part of the driving mechanism 31. Due to this layout, in the space occupied by the present disk brake 100, a dead space thereof can be reduced. In addition, this advantageous effect is especially effective when a so-called brushless motor is employed as the electric motor 58, in which the outer diameter of the main body portion 58A thereof is greater than the axial length of the main body portion 58A thereof.

Next, the disk brake 200 according to the second embodiment will be described with reference to FIGS. 8 to 10. The disk brake 200 according to this second embodiment will be described mainly focusing only on differences from the disk brake 100 according to the first embodiment.

Figure 8:
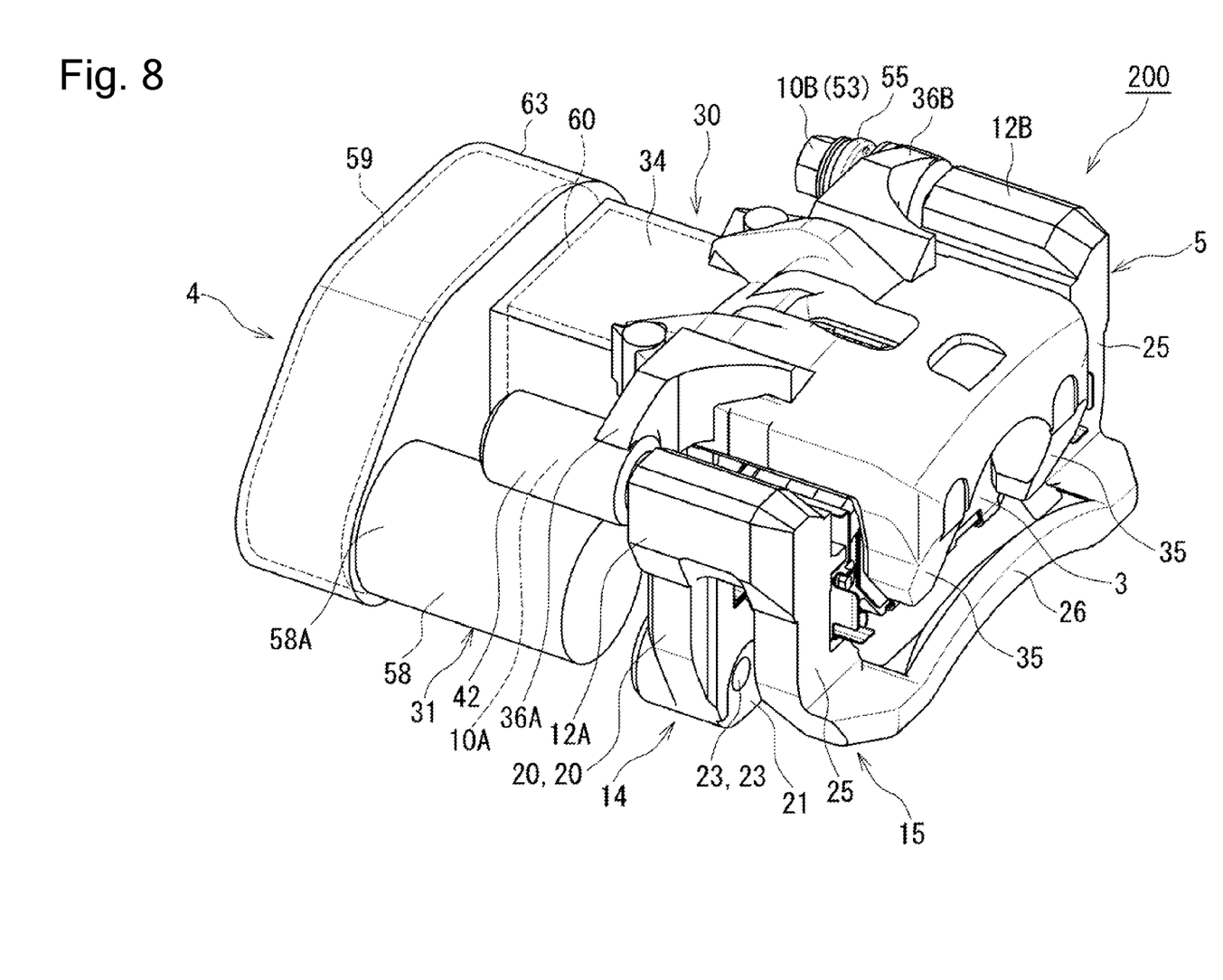
FIG. 8 is a perspective view of a disk brake according to a second embodiment.
Figure 9:
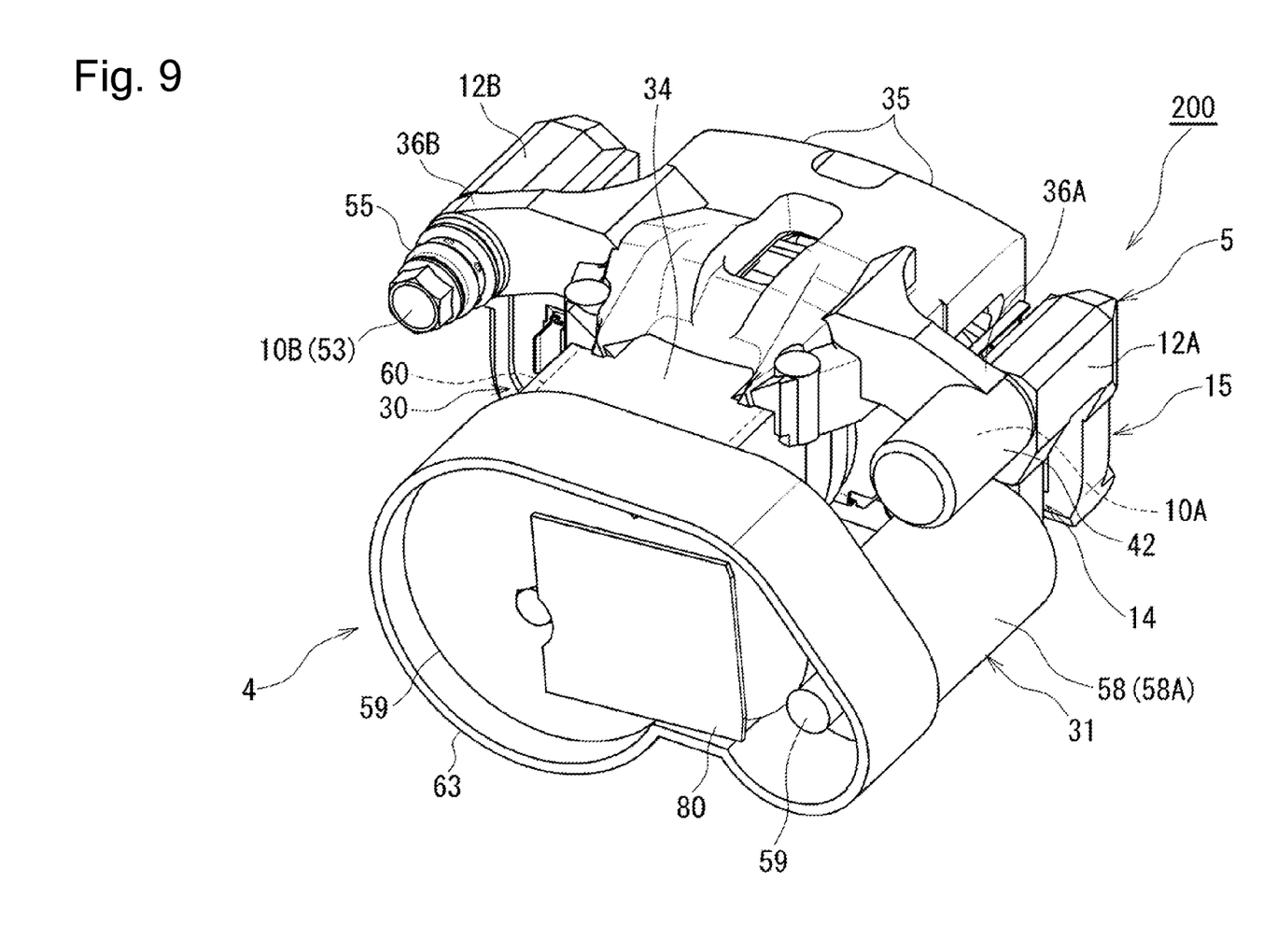
FIG. 9 is a perspective view of the disk brake according to the second embodiment.
Figure 10:
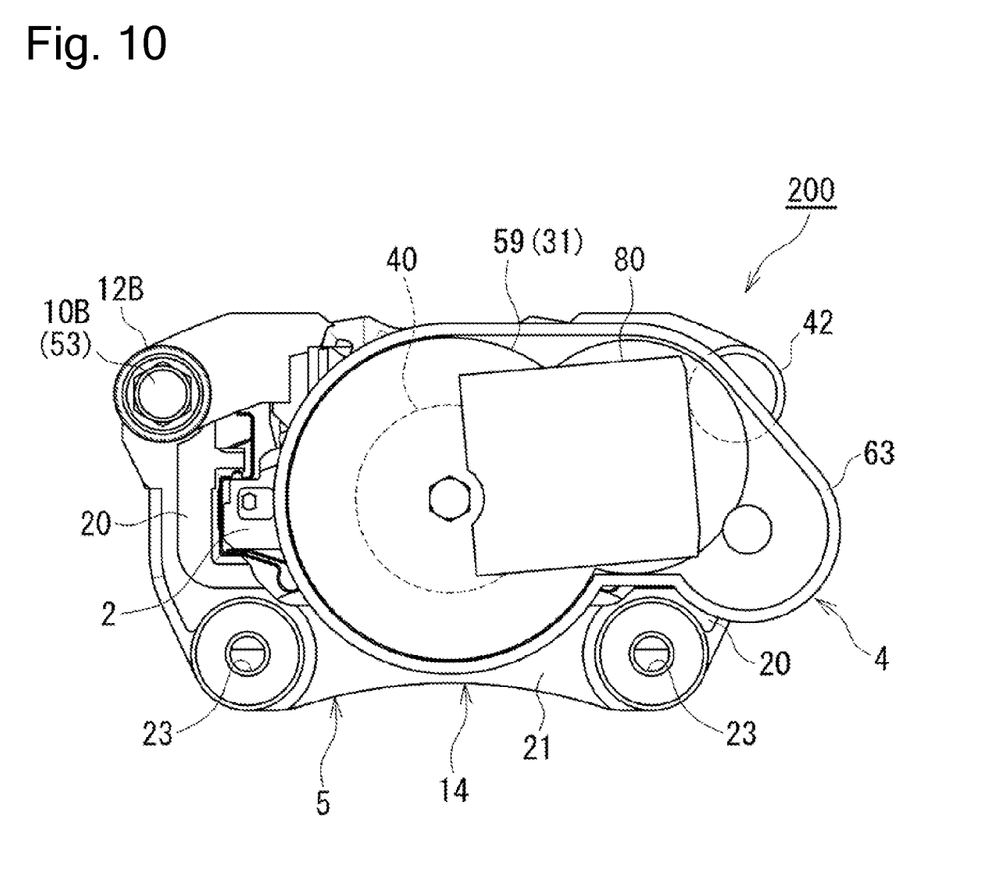
FIG. 10 is a front view of the disk brake according to the second embodiment as viewed from the inner side.

The disk brake 200 according to the second embodiment employs the electric motor 58 in which the outer diameter of the main body portion 58A is smaller than the axial length thereof as illustrated in FIGS. 8 to 10. The boss portion 42 provided on the one caliper arm portion 36A of the caliper main body 30 is located on the cylinder portion 34 side on the radially outer side of the main body portion 58A of the electric motor 58. Then, a part of the driving mechanism 31, i.e., a part of the speed reduction mechanism 59 is disposed on the extension of the axis of the boss portion 42 of the one caliper arm portion 36A, i.e., the one slide pin 10A. In other words, a part of the boss portion 42 of the one caliper arm portion 36A axially overlaps a part of the speed reduction mechanism 59, and this naturally means that a part of the one slide pin 10A axially overlaps a part of the speed reduction mechanism 59. This layout can contribute to preventing an increase in the size of the present disk brake 200 and also preventing even an increase in the weight thereof even when a so-called brushed motor is employed as the electric motor 58, in which the outer diameter of the main body portion 58A thereof is smaller than the axial length.

Next, the disk brake 300 according to the third embodiment will be described with reference to FIGS. 11 to 14. The disk brake 300 according to this third embodiment will be described mainly focusing only on differences from the disk brake 100 according to the first embodiment.

Figure 11:
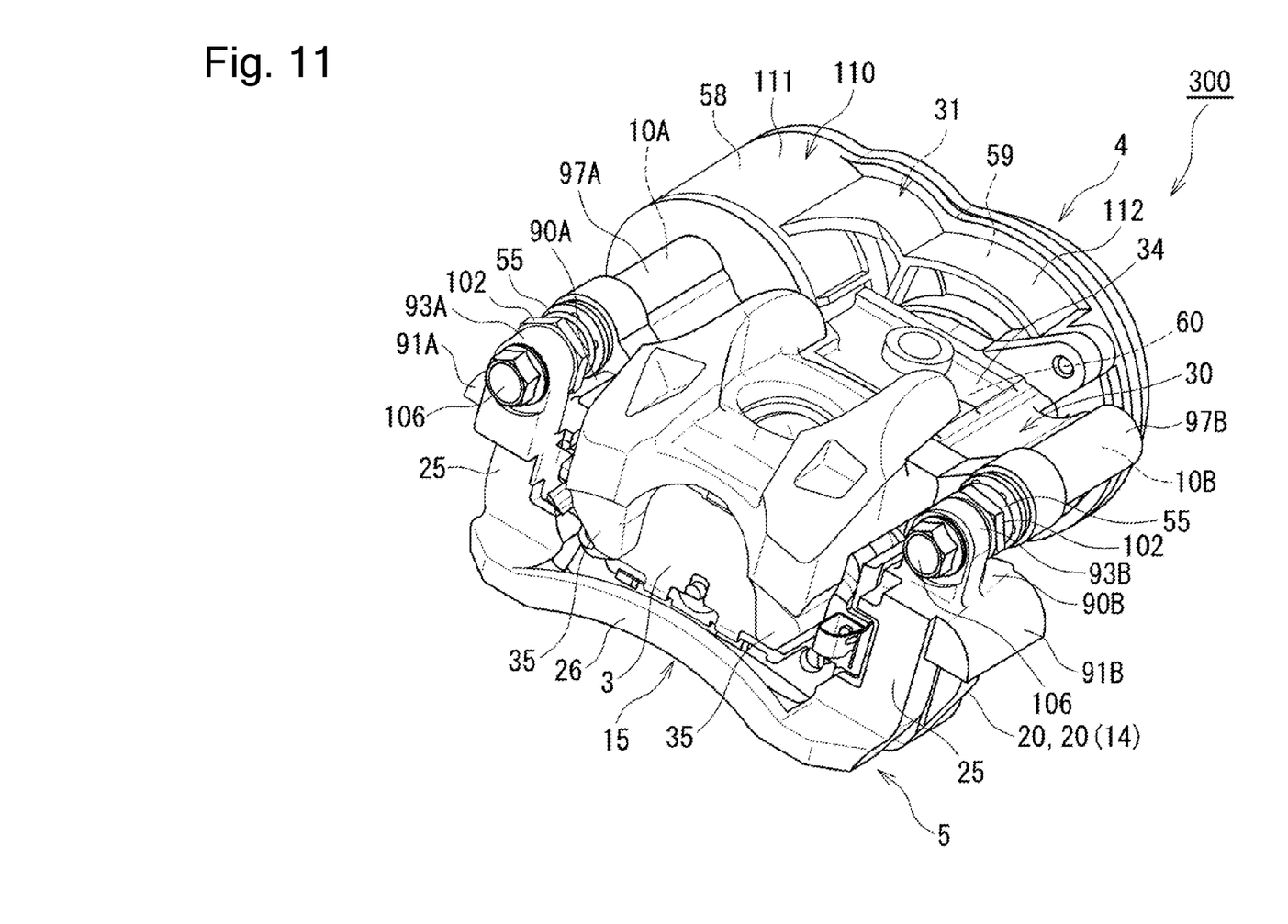
FIG. 11 is a perspective view of a disk brake according to a third embodiment.
Figure 12:
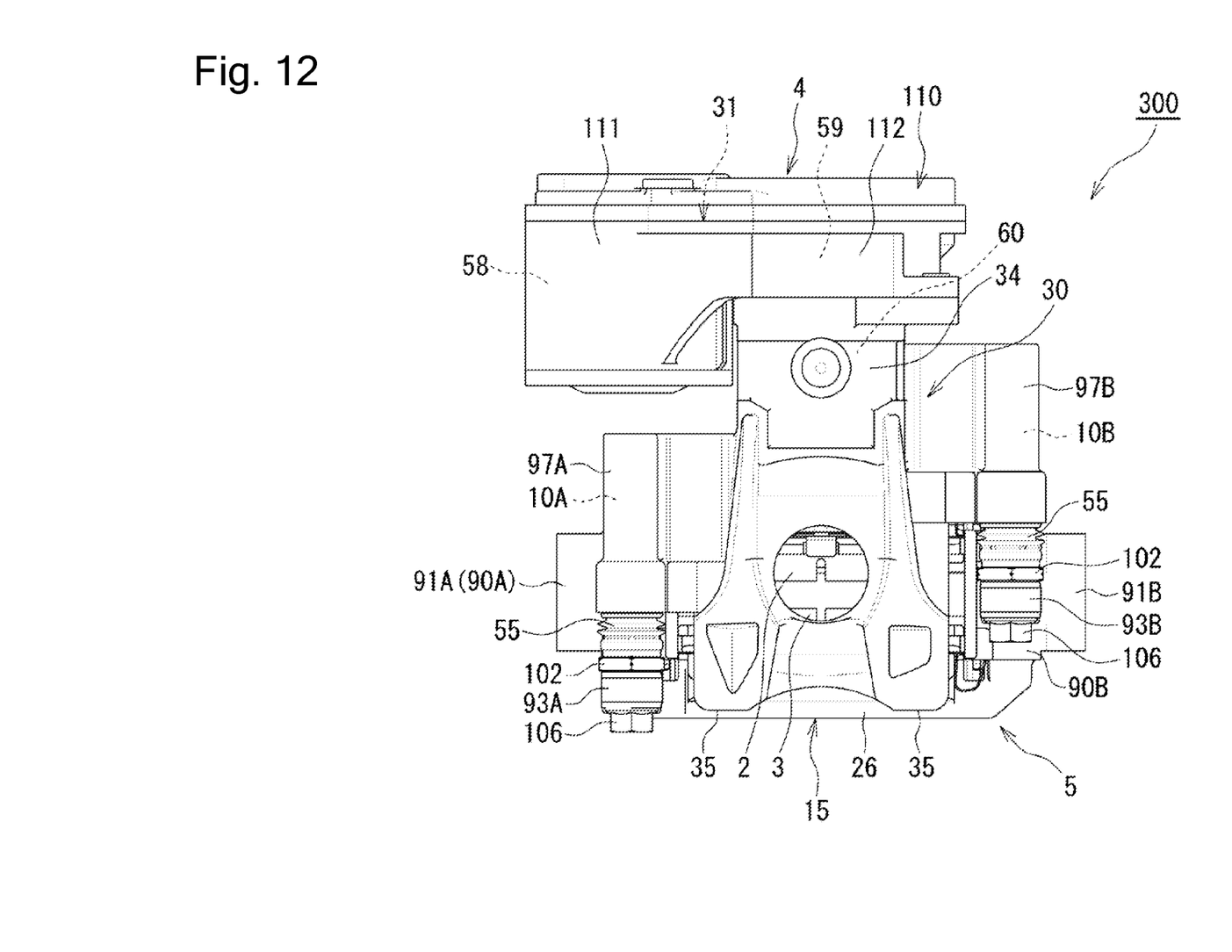
FIG. 12 is a plane view of the disk brake according to the third embodiment.

As illustrated in FIGS. 11 and 12, the carrier 5 includes the inner-side support portion 14 (also refer to FIGS. 1 and 3), the outer-side support portion 15 (also refer to FIG. 1), and a pair of connection portions 90A and 90B. The inner-side support portion 14 supports the inner brake pad 2. The outer-side support portion 15 supports the outer brake pad 3. The pair of connection portions 90A and 90B connects the inner-side support portion 14 and the outer-side support portion 15 to each other. The connection portions 90A and 90B are provided so as to connect the end portions of the inner-side arm portions 20 opposite from the inner-side beam portion 21 side, and the end portions of the outer-side arm portions 25 opposite from the outer-side beam portion 26 side to each other, respectively.

Block portions 91A and 91B are integrally provided on the connection portions 90A and 90B in protruding manners in directions away from each other in the rotational direction of the disk rotor D, respectively. Each of the block portions 91A and 91B is shaped like a fan in cross section (the central angle: approximately 90°), and extends in the axial direction of the disk rotor D. Carrier arm portions 93A and 93B are provided on the connection portions 90A and 90B in protruding manners on the opposite sides from the inner-side beam portion 21 side and the outer-side beam portion 26 side, respectively. The one carrier arm portion 93A is located on the outer side with respect to the outer-side arm portion 25 of the outer-side support portion 15. The other carrier arm portion 93B is located on the inner side with respect to the outer-side arm portion 25 of the outer-side support portion 15. In sum, the one carrier arm portion 93A is located on the outer side with respect to the other carrier arm portion 93B in the axial direction of the disk rotor D. Through-holes 95A and 95B extending along the axial direction of the disk rotor D are formed through the carrier arm portions 93A and 93B, respectively (refer to FIGS. 13 and 14).

Figure 13:
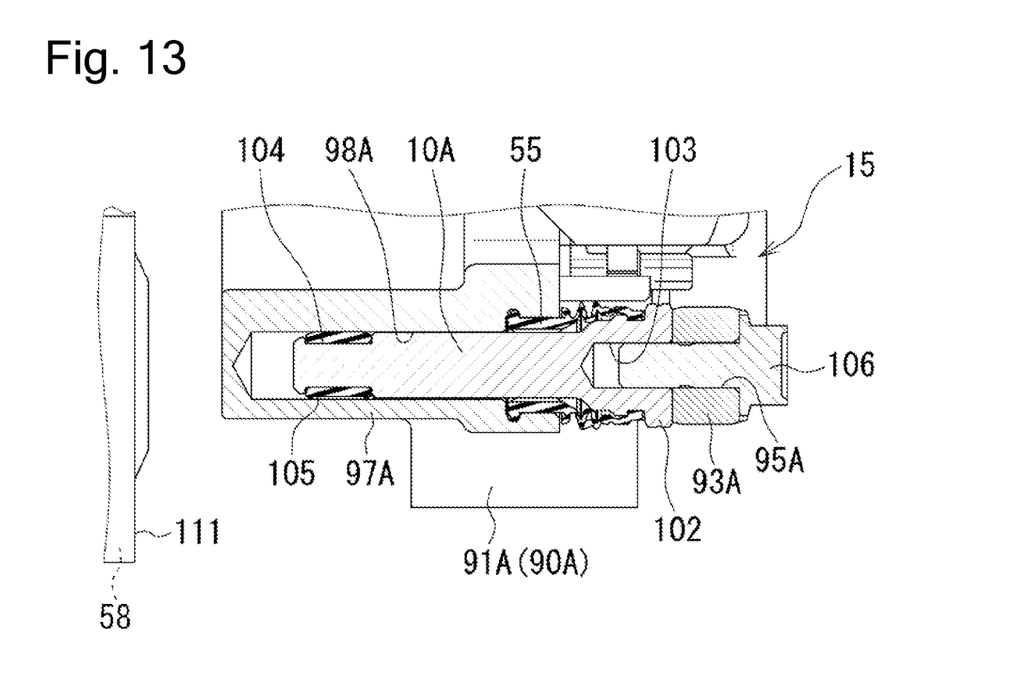
FIG. 13 is a cross-sectional view illustrating a support structure using one of slide pins that is employed in the disk brake illustrated in FIG. 11.
Figure 14:
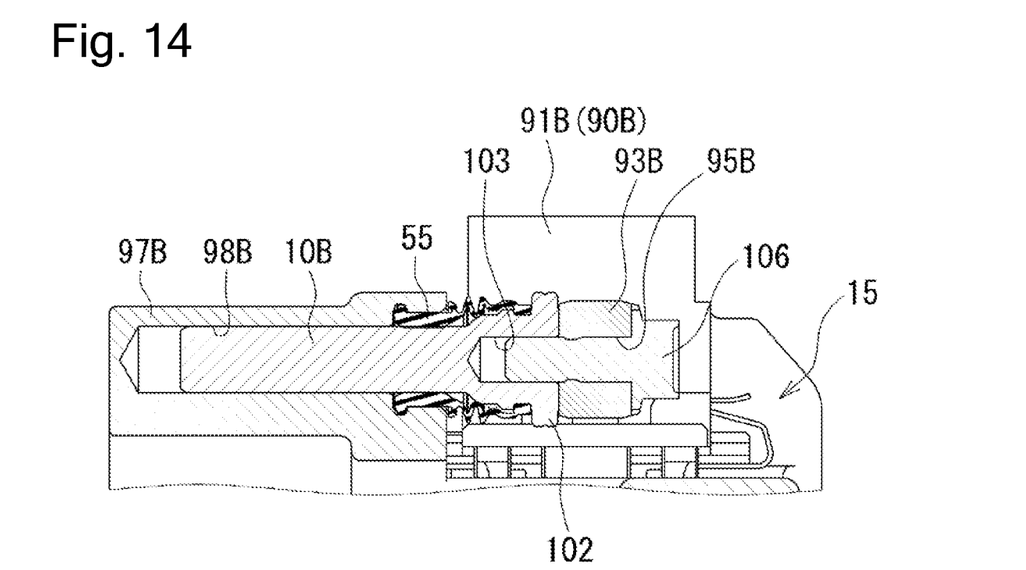
FIG. 14 is a cross-sectional view illustrating a support structure using the other of the slide pins that is employed in the disk brake illustrated in FIG. 11.

Pin sliding movement portions 97A and 97B are provided on the cylinder portion 34 of the caliper main body 30 in protruding manners. The pair of slide pins 10A and 10B moves slidably along the axial direction inside the pin sling movement portions 97A and 97B, respectively. The pair of pin sliding movement portions 97A and 97B extends along the axial direction of the disk rotor D. The one pin sliding movement portion 97A is located on the outer side with respect to the other pin sliding movement portion 97B in the axial direction of the disk rotor D. The pin sliding movement portions 97A and 97B are disposed on the inner side with respect to the pair of carrier arm portions 93A and 93B of the carrier 5, respectively, and are provided in protruding manners at positions facing the through-holes 95A and 95B of the pair of carrier arm portions 93A and 93B in the axial direction of the disk rotor D, respectively. As illustrated in FIGS. 13 and 14, the pin sliding movement portions 97A and 97B are formed into bottomed cylindrical shapes including sliding movement holes 98A and 98B that open the end surfaces on the outer side, respectively. On the other hand, the slide pins 10A and 10B extend along the axial direction of the disk rotor D. These slide pins 10A and 10B include hexagonal head portions 102 and 102 and female screw holes 103 and 103. The hexagonal head portions 102 and 102 are provided at the end portions of the slide pins 10A and 10B on the outer side, respectively. The female screw holes 103 and 103 are provided so as to have predetermined depths from the radial centers of the end surfaces of these hexagonal head portions 102 and 102 on the outer side, respectively. An annular groove portion 104 is provided on the outer peripheral surface of the distal end of the one slide pin 10A. A sleeve 105 is mounted in this annular groove portion 104.

Then, the pair of slide pins 10A and 10B is inserted slidably along the axial direction through the sliding movement holes 98A and 98B of the respective pin sliding movement portions 97A and 97B provided on the cylinder portion 34 from the outer side, respectively. The corresponding carrier arm portions 93A and 93B of the carrier 5 are brought into abutment with the outer-side end surfaces of the hexagonal head portions 102 and 102 of the slide pins 10A and 10B, respectively. Then, hexagonal bolts 106 and 106 as a fixation member are inserted through the through-holes 95A and 95B of the carrier arm portions 93A and 93B, respectively, and are threadably engaged with the female screw holes 103 and 103 of the slide pins 10A and 10B, respectively. In other words, the slide pins 10A and 10B are fixedly attached to the carrier arm portions 93A and 93B of the carrier 5 by the hexagonal bolts 106 and 106, respectively, and these slide pins 10A and 10B are inserted through the sliding movement holes 98A and 98B of the pin sliding movement portions 97A and 97B slidably along the axial direction, respectively. As a result, the caliper main body 30 can be supported with use of the pair of slide pins 10A and 10B slidably relative to the carrier 5 along the axial direction of the disk rotor D.

In this manner, when the hexagonal bolts 106 and 106 are inserted through the through-holes 95A and 95B of the carrier arm portions 93A and 93B, respectively, and are threadably engaged with the female screw holes 103 and 103 of the slide pins 10A and 10B, respectively, the hexagonal bolts 106 and 106 are supposed to be fastened from the outer side opposite from the electric motor 58 and speed reduction mechanism 59 side. As a result, as seen from FIGS. 11 and 12, the respective head portions of the hexagonal bolts 106 and 106 are supposed to be located on the outer side opposite from the electric motor 58 and speed reduction mechanism 59 side (the inner side) in the axial direction of the disk rotor D. Referring to FIGS. 13 and 14, the pin boots 55 and 55 are provided between around the sliding movement holes 98A and 98B of the pin sliding movement portions 97A and 97B and the hexagonal head portions 102 and 102 of the slide pins 10A and 10B, respectively. The pin boots 55 and 55 include the extensible and compressible bellows portions so as to cover the slide pins 10A and 10B, respectively.

As illustrated in FIGS. 11 and 12, the electric motor 58 and the speed reduction mechanism 59, which are the components of the driving mechanism 31, are housed in a motor gear housing 110. The electric motor 58 is configured in such a manner that the outer diameter of the main body portion 58A thereof is greater than the axial length thereof (refer to FIG. 1) similarly to the electric motor 58 employed in the disk brake 100 according to the first embodiment. The motor gear housing 110 is configured to integrally connect a generally cylindrical motor housing portion 111, which houses the electric motor 58 therein, and a gear housing portion 112, which houses the speed reduction mechanism 59 therein, to each other.

A part of the driving mechanism 31, i.e., the electric motor 58 in the motor housing 111 is disposed on the extension of the axis of the one slide pin 10A. The electric motor 58 is disposed on the extension of the axis of the one pin sliding movement portion 97A provided on the cylinder portion 34. In other words, the electric motor 58 axially overlaps the one pin sliding movement portion 97A, i.e., the one slide pin 10A. The surface of the one pin sliding movement portion 97A on the inner side is disposed close to the bottom surface of the motor housing portion 111 while the bottom surface of the motor housing 111 and the surface of the one pin sliding movement portion 97A on the inner side face each other. The radial entire region of the one pin sliding movement portion 97A, naturally meaning the entire radial region of the one slide pin 10A is located within the radial range of the bottom surface of the motor housing portion 111. The other pin sliding movement portion 97B including the other slide pin 10B is located outside the gear housing portion 112 of the motor gear housing 110 without being covered by the motor gear housing 110 from the inner side.

In the above-described disk brake 300 according to the third embodiment, at least a part of the driving mechanism 31, i.e., the electric motor 58 (the motor housing portion 111) is disposed on the extension of the axis of the one slide pin 10A, similarly to the disk brake 100 according to the first embodiment. As a result, the disk brake 300 can prevent an increase in the size of the present disk brake 300 to improve the mountability onto the vehicle, and also prevent a weight increase.

Further, in the disk brake 300 according to the third embodiment, the hexagonal bolts 106 and 106 (the fixation member) for fixing the pair of slide pins 10A and 10B to the pair of carrier arm portions 93A and 93B are disposed on the outer side opposite from the electric motor 58 and speed reduction mechanism 59 side (the inner side) in the axial direction of the disk rotor D, i.e., the axial direction of the slide pins 10A and 10B. This configuration facilitates mounting the caliper main body 30 slidably along the axial direction of the disk rotor D (the wheel) relative to the carrier 5 with use of the pair of slide pins 10A and 10B.

Further, in the disk brake 300 according to the third embodiment, the cylinder portion 34 of the caliper main body 30 is located on the inner side with respect to the inner-side support portion 14 and the outer-side support portion 15 of the carrier 5, and the pair of piston sliding movement portions 97A and 97B is provided on this cylinder portion 34. Then, the pair of slide pins 10A and 10B is inserted through the sliding movement holes 98A and 98B of the pair of pin sliding movement portions 97A and 97B from the outer side, and is supported slidably along the axial direction. This configuration allows the position of the center of gravity of the present disk brake 300 in the axial direction of the disk rotor D to be located within the sliding movement range of at least one of the pair of slide pins 10A and 10B corresponding to the sliding movement holes 98A and 98B of the pair of pin sliding movement portions 97A and 97B. As a result, a drag torque can be reduced between the sliding movement holes 98A and 98B of the pair of pin sliding movement portions 97A and 97B and the pair of slide pins 10A and 10B.

The above-described embodiments may be employed for the disk brake configured in the following manner. When the vehicle is braked while running normally, the disk brake causes the piston 40 to advance by the brake hydraulic pressure supplied into the cylinder bore of the caliper main body 30 to thus sandwich the disk rotor D between the pair of inner and outer brake pads 2 and 3, thereby generating the braking force. At the time of parking brake when, for example, the vehicle is parked, the disk brake transmits the driving force from the electric motor 58 to the piston 40 via the speed reduction mechanism 59 and the thrust force application mechanism 60 to thus advance this piston 40 to sandwich the disk rotor D between the pair of inner and outer brake pads 2 and 3, thereby generating the braking force.

Possible configurations as the disk brakes 100, 200, and 300 based on the above-described first to third embodiments include the following examples.

According to a first configuration, a disk brake (100, 200, 300) includes a carrier (5) fixed to a non-rotatable portion of a vehicle, a caliper (4) attached to this carrier (5) and including a piston (40) configured to press a braking member (2), a slide pin (10A) fixed to any of the carrier (5) and the caliper (4) and configured to support the caliper (4) slidably relative to the carrier (5) in an axial direction of a wheel, and a driving mechanism (31) including an electric motor (58) and a speed reduction mechanism (59) and configured to transmit a driving force of the electric motor (58) to the piston (40) via the speed reduction mechanism (59). At least a part of the driving mechanism 31 is disposed on an extension of an axis of the slide pin (10A).

According to a second configuration, in the first configuration, a fixation member (106, 106) for fixing the slide pin (10A, 10B) is disposed on an opposite side from an electric motor (58) side in an axial direction of the slide pin (10A, 10B).

According to a third configuration, in the first or second configuration, the slide pin (10A, 10B) includes at least two slide pins. The part of the driving mechanism (31) is disposed on the extension of the axis of at least one (10A) of the slide pins.

According to a fourth configuration, in any of the first to third configurations, the slide pin (10A) with the driving mechanism (31) disposed on the extension of the axis of this slide pin (10A) is fixed to the carrier (5) and also supports the caliper (4) axially slidably.

According to a fifth configuration, in any of the first to fourth configurations, the electric motor (58) is disposed on the extension of the axis of the slide pin (10A).

According to a sixth configuration, in any of the first to fifth configurations, the electric motor (58) is configured in such a manner that an outer diameter of a main body portion thereof (58A) is greater than an axial length of the main body portion thereof (58A).

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-121045 filed on Jun. 26, 2018 and Japanese Patent Application No. 2019-013080 filed on Jan. 29, 2019. The entire disclosure of Japanese Patent Application No. 2018-121045 filed on Jun. 26, 2018 including the specification, the claims, the drawings, and the abstract, and the entire disclosure of Japanese Patent Application No. 2019-013080 filed on Jan. 29, 2019 including the specification, the claims, the drawings, and the abstract are incorporated herein by reference in its entirety.

REFERENCE SIGNS LIST 100, 200, 300 disk brake
2 inner brake pad (braking member)
3 outer brake pad (braking member)
4 caliper
5 carrier
10A, 10B slide pin
30 caliper main body
31 driving mechanism
34 cylinder portion
40 piston
58 electric motor (electric motor)
58A main body portion
59 speed reduction mechanism
60 thrust force application mechanism
106 hexagonal bolt (fixation member)
D disk rotor

The invention claimed is:
1. A disk brake comprising:
a carrier fixed to a non-rotatable portion of a vehicle;
a caliper attached to the carrier, and including a piston configured to press inner and outer brake pads;
a first slide pin fixed to any of the carrier and the caliper, and configured to support the caliper slidably relative to the carrier in an axial direction of a wheel; and
a driving mechanism including an electric motor and a speed reduction mechanism, and configured to transmit a driving force of the electric motor to the piston via the speed reduction mechanism,
wherein at least a part of the driving mechanism is disposed on an extension of an axis of the first slide pin,
the driving mechanism is disposed on an inner side of the vehicle with respect to the carrier in the axial direction of the first slide pin,
a fixation member for fixing the first slide pin is disposed on the carrier at an outer side of the vehicle in an axial direction of the first slide pin, the fixation member is disposed at the outer side of the vehicle more than at least one of the inner brake pad and the outer brake pad, and the fixation member is disposed at the outer side of the vehicle more than an outer side of the caliper.

2. The disk brake according to claim 1, wherein the disk brake further comprises a second slide pin, wherein the second slide pin is fixed to any of the carrier and the caliper, and is configured to slidably support the caliper relative to the carrier in an axial direction of the wheel.

3. The disk brake according to claim 2, wherein the first and second slide pins are fixed to the carrier and also support the caliper axially slidably.

4. The disk brake according to claim 1, wherein the electric motor is disposed on the extension of the axis of the first slide pin.

5. The disk brake according to claim 1, wherein the electric motor is configured in such a manner that an outer diameter of a main body portion thereof is greater than an axial length of the main body portion thereof.

\* \* \* \* \*